United States Patent [19]

Kim et al.

[11] Patent Number: 4,828,350
[45] Date of Patent: May 9, 1989

[54] FIBER OPTIC MODE SELECTOR

[75] Inventors: Byoung Y. Kim, Menlo Park; Wayne V. Sorin; Herbert J. Shaw, both of Stanford, all of Calif.

[73] Assignee: The Board of Trustees of the Leland Stanford Junior University, Stanford, Calif.

[21] Appl. No.: 820,411

[22] Filed: Jan. 17, 1986

[51] Int. Cl.$^4$ .............................................. G02B 6/26
[52] U.S. Cl. ................................ 350/96.15; 350/96.19
[58] Field of Search ............... 350/96.11, 96.12, 96.13, 350/96.14, 96.15, 96.16, 96.19; 370/1, 3

[56] References Cited

U.S. PATENT DOCUMENTS

| | | | |
|---|---|---|---|
| 3,625,589 | 12/1971 | Snitzer . | |
| 4,268,116 | 5/1981 | Schmadel et al. | 350/96.29 |
| 4,301,543 | 11/1981 | Palmer | 455/612 |
| 4,307,933 | 12/1981 | Palmer et al. | 350/96.16 |
| 4,312,562 | 1/1982 | Segawa et al. | 350/96.15 |
| 4,493,528 | 1/1985 | Shaw | 350/96.15 |
| 4,515,430 | 5/1985 | Johnson | 350/96.13 |
| 4,536,058 | 8/1985 | Shaw et al. | 350/320 |
| 4,556,279 | 12/1985 | Shaw et al. | 350/96.15 |
| 4,560,234 | 12/1985 | Shaw et al. | 350/96.15 |
| 4,735,484 | 4/1988 | Fesler . | |
| 4,735,485 | 4/1988 | Shaw et al. . | |

FOREIGN PATENT DOCUMENTS 8110947 12/1982 France .

OTHER PUBLICATIONS

R. G. Lamont et al., "Tuned-Port Twin Biconical-Taper Fiber Splitters: Fabrication from Dissimilar Low-Mode-Number Fibers," *Optics Letters*, vol. 10, No. 1, Jan. 1985, pp. 46–48.

Thomas H. Wood et al., "Demonstration of Effectively Non-Reciprocal Optical Fiber Directional Couplers," Post Deadline Paper PD14-1, Conference on Optical Fiber Sensors, San Diego, Calif., Feb. 13–14, 1985.

W. P. Risk et al., SPIE, "Single-Sideband Frequency Shifting in Birefringent Optical Fiber," vol. 478, *Fiber Optic and Laser Sensors II* (1984).

W. P. Risk et al., Optics Letters, "Acousto-Optic Frequency Shifting in Birefringent Fiber," vol. 9, No. 7, Jul. 1984.

Risk et al., Proceedings of the IEEE Ultrasonics Symposium, "Acoustic-Optic Modulators," Nov. 14–16, 1984.

Risk et al., Optics Letters, "Acousto-Optic Polarization Coupler and Intensity Modulator for Birefringent Fiber," vol. 11, No. 1, Jan. 1986.

R. Ulrich et al., Applied Optics, "Single-Mode Fiber-Optical Polarization Rotator," vol. 18, No. 11, Jun. 1, 1979.

Digonnet & Shaw, "Analysis of a Tunable Single Mode Optical Fiber Coupler", IEEE Journal of Quantum Electronics, vol. QE 18, No. 4, Apr. 1982.

Pleibel et al., *Electronics Letters*, vol. 19, No. 20, Sep. 29, 1983, "Polarisation-Preserving Coupler with Self Aligning Birefringent Fibres", pp. 825–826.

D. Gloge, "Weakly Guiding Fibers," *Applied Optics*, vol. 10, No. 10, Oct. 1971, pp. 2252–2258

A. Yariv, "Coupled-mode Theory for Guided-wave Optics," *IEEE Journal of Quantum Electronics*, vol. QE-9, No. 9, Sep. 1973, pp. 919–933.

B. S. Kawasaki et al., "Narrow-band Bragg Reflectors in Optical Fibers," *Optics Letters*, vol. 3, No. 2, Aug. 1978, pp. 66–68.

R. A. Bergh et al., "Single-Mode Fibre Optic Directional Coupler," *Electronics Letters*, vol. 16, No. 7, Mar. 27, 1980, pp. 260–261.

K. Nosu et al., "Acousto-Optic Frequency Shifter for Single Mode Fibers," published at the 47th International Conference on Integrated Optics and Optical Fiber Communications in Tokyo, Jun. 27–30, 1983, Paper 29C5-3.

K. Nosu et al., "Acoustooptic Phase Modulator for Single Mode Fibers," published at the 47th International Conference on Integrated Optics and Optical Fiber Communications in Tokyo, Jun. 27–30, 1983, Paper 28C3-5.

K. Nosu et al., "Acousto-Optic Frequency Shifter for Single Mode Fibres," Electronics Letters, vol. 19, No. 22, Sep. 22, 1983, pp. 816–818.

R. C. Youngquist et al., "Two-Mode Fiber Modal Coupler," *Optics Letters*, vol. 9, No. 5, May 1984, pp. 177–179.

H. F. Taylor, "Bending Effects in Optical Fibers," *Jour-*

*nal of Lighwave Technology*, vol. LT-2, No. 5, Oct. 1984, pp. 617–628.

P. Bassi et al., "Experimental Results on Coupling Between Optical Fibers Operating in Low Multimode Regime," Atti Della Quinta Riunione Nazionale Di Elettromagnetismo Applicato, Oct. 9–12, 1984, pp. 329–332.

*Primary Examiner*—William L. Sikes
*Assistant Examiner*—Frank González
*Attorney, Agent, or Firm*—Knobbe, Martens, Olson & Bear

[57] ABSTRACT

An all fiber mode selector comprises a single-mode optical fiber and a double-mode optical fiber, each having a facing surface formed on one side of the cladding. The facing surfaces are juxtaposed in close facing relationship. The fibers are selected so that an optical signal propagating in the $LP_{11}$ propagation mode of the double-mode optical fiber propagates at substantially the same phase velocity as an optical signal propagating in the $LP_{01}$ propagation mode of the single-mode optical fiber. The evanescent fields of the two fibers interact to couple optical energy from the $LP_{11}$ mode of the double-mode optical fiber to the $LP_{01}$ mode of the single-mode optical fiber and vice versa.

34 Claims, 18 Drawing Sheets

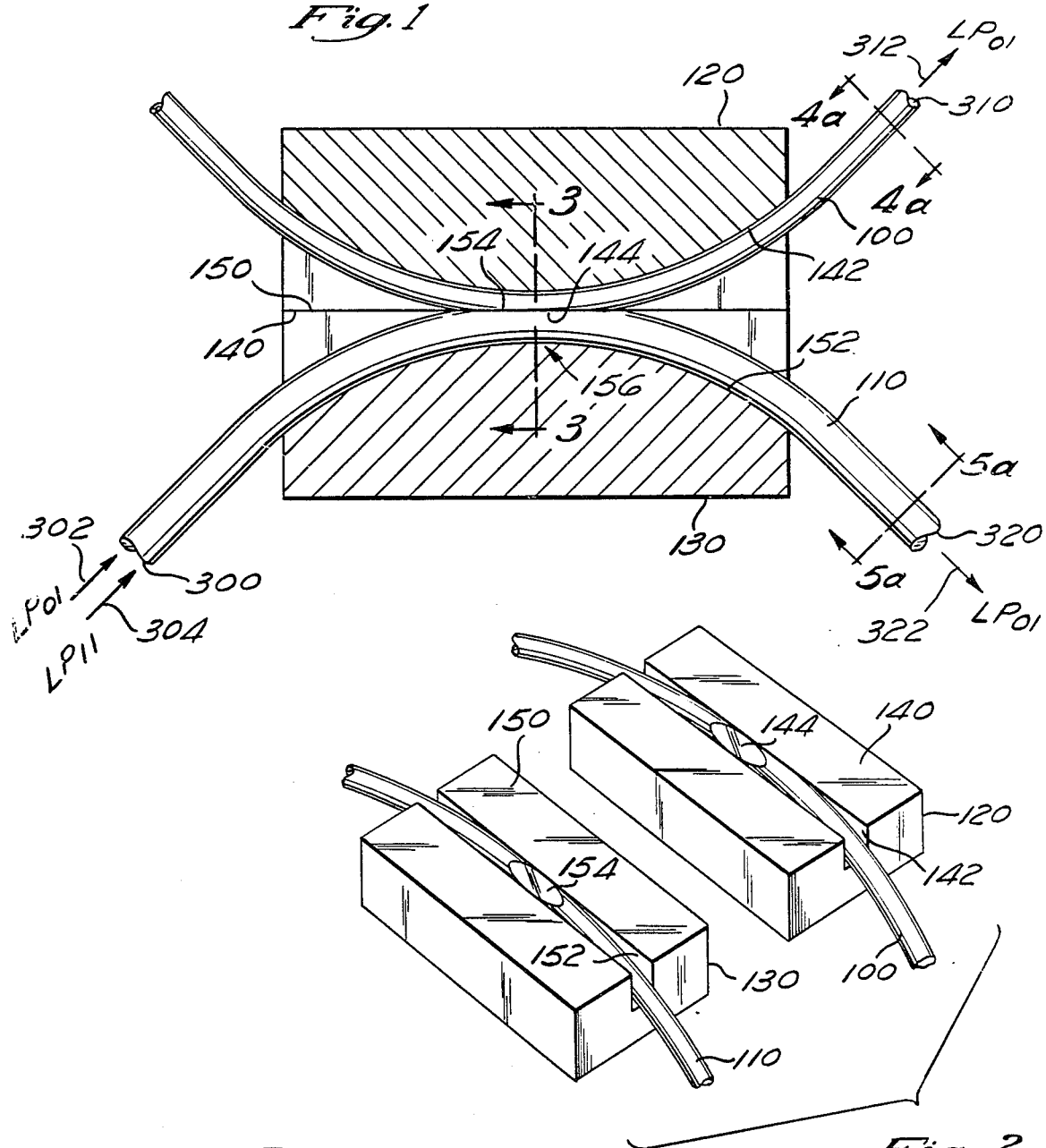
Fig. 1
Fig. 2
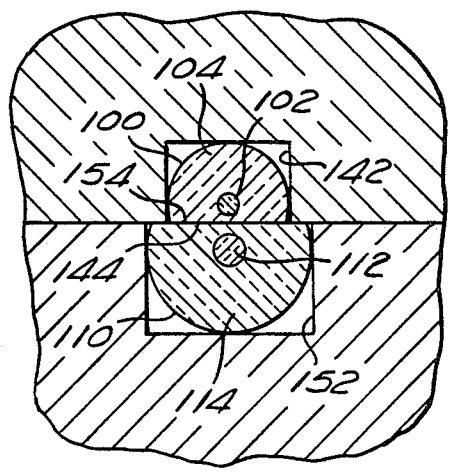
Fig. 3

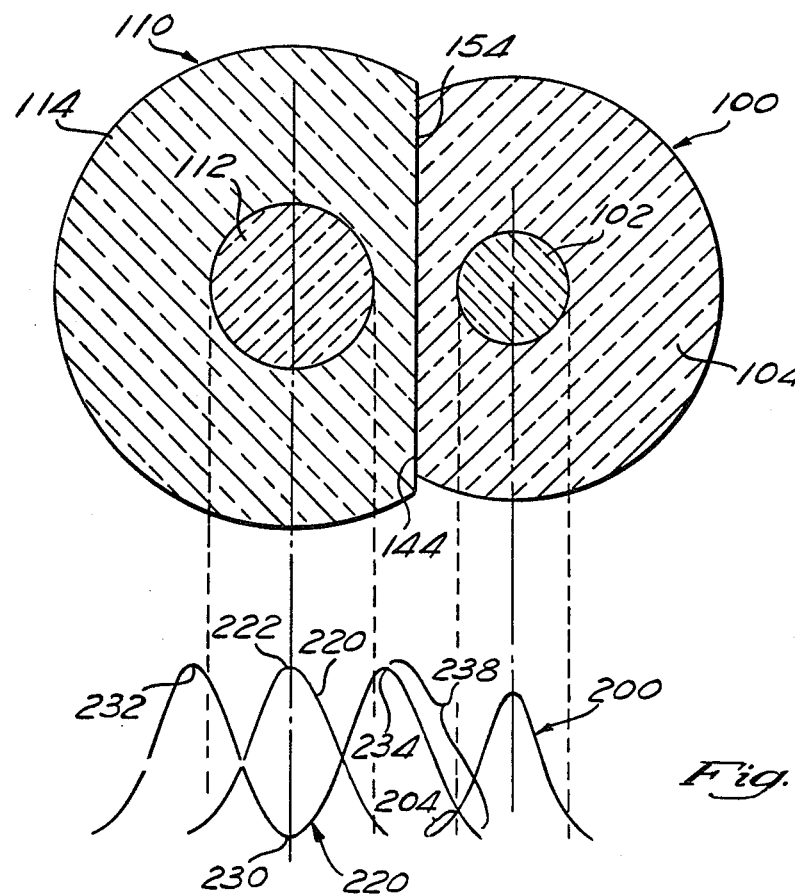

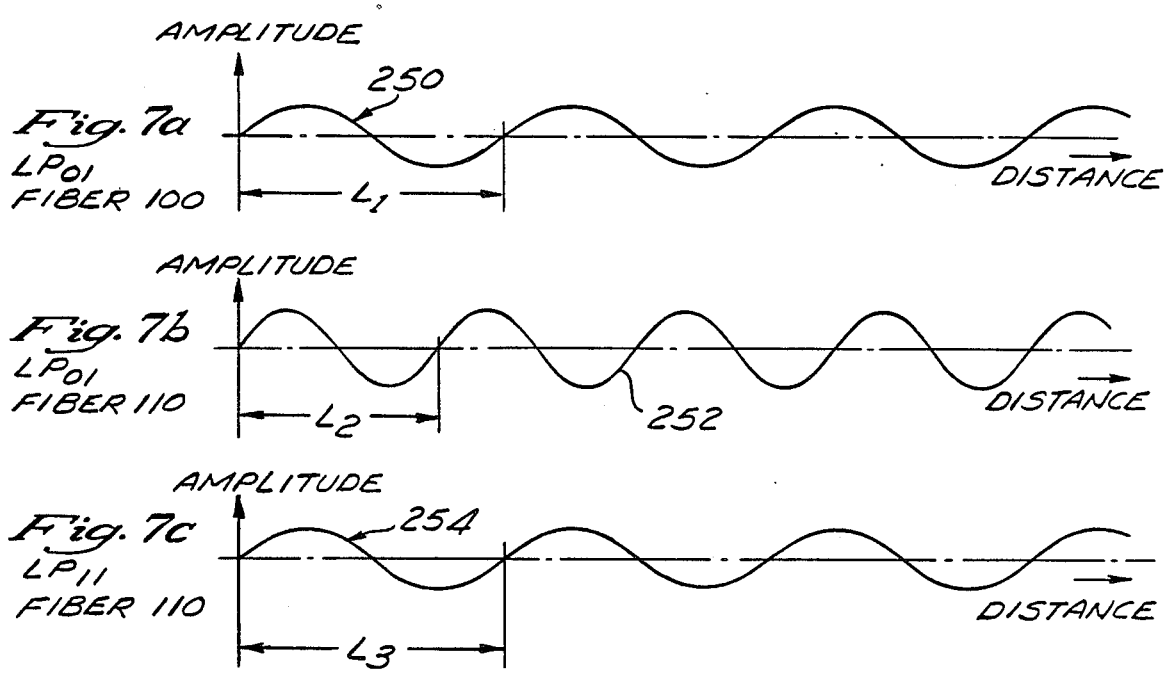
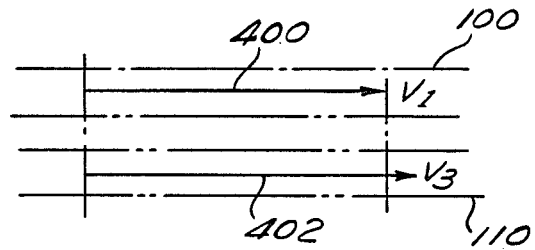
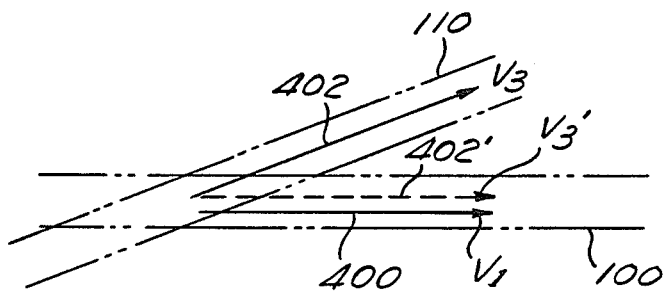

FIBER OPTIC MODE SELECTOR

FIELD OF THE INVENTION

The present invention relates generally to fiber optic coupling devices, and more specifically to devices that couple light energy between selected modes of two dissimilar optical fibers.

BACKGROUND OF THE INVENTION

In fiber optic systems, it is frequently desirable to remove, select, or suppress certain propagation modes of an optical signal. For example, in a two-mode optical fiber having an optical signal propagating therein in the first and second order spatial propagation modes, it is known that the light propagating in the second order mode can be "stripped" from the optical signal within the fiber by forming a segment of the fiber's length into a coil having a suitably selected coil diameter. The coil diameter is selected to perturb the second order mode without substantially affecting the first order mode, such that light propagating in the second order mode of the fiber enters the cladding of the optical fiber and escapes therefrom. The portion propagating in the first order mode is guided by the fiber and remains within the fiber's core. This light in the first order mode does not ordinarily couple to the second order mode due to the difference in propagation constants between the first order and second order modes of the fiber. Thus, after passing through the length of coil fiber, the optical signal propagates substantially solely in the first order propagation mode. Thus, the "mode stripper" allows the selection of the light propagating in the first order mode through removal of the light in the second order mode.

Although a mode stripper is an advantageous device, its uses are limited, since the light that is stripped from the fiber merely radiates into free space. The mode stripper does not have the capability of coupling selected modes of two different optical fibers. The ability to couple a selected spatial mode of one optical fiber to a selected spatial mode of another optical fiber has many uses in a fiber optic system. For example, in a fiber optic frequency shifter wherein light propagating in a first order mode is coupled to a second order mode and is shifted in frequency, it is desirable that the portion of the frequency shifted light in the second order mode be coupled to a selected mode of a different fiber so as to be able to transmit the light at the shifted frequency. Thus, a need exists for a mode selector which can, for example, separate lower order modes (e.g., a first order mode) from higher order modes (e.g., a second order mode) and provide the higher order mode as an output for further use in the fiber optic system.

SUMMARY OF THE INVENTION

The present invention comprises a mode selector which provides a means for separating light propagating in two or more modes in a multimode fiber and coupling light from a selected one of these modes to a selected mode of a separate optical fiber. The present invention thus operates as a fiber optic mode filter.

The present invention includes first and second dissimilar optical fibers. The first optical fiber has at least one propagation mode and the second optical fiber has at least two propagation modes. Only two of the propagation modes have matching propagation velocities. One of the modes having a matching propagation velocity is in the first fiber and the other of the modes having the matching propagation velocity is one of the two modes in the second fiber. In the preferred embodiment, each of the two fibers is arcuately mounted in a supporting structure, and a portion of the cladding is removed from one side of each of the fibers to form oval cladding surfaces which are juxtaposed to form an interaction region. The cores of the fibers have substantially the same cross section inside the interaction region as outside the interaction region, and the proximity of cores at the interaction region is selected such that light propagating in one of the matching propagation modes in one of the fibers is coupled to the other of the matching modes in the other of the fibers. The length of the interaction region is selected to cause substantially complete coupling between the two propagation modes having the matched propagation velocities. The remainder of the propagation modes in both of the fibers have mismatched propagation velocities such that the propagation velocity of each of the mismatched propagation modes differs sufficiently from the propagation velocities of all of the other propagation modes to prevent substantial optical coupling between any of the mismatched modes.

In the preferred embodiment, the second fiber has an inner core which has a diameter greater than the inner core of the first fiber. More specifically, the first fiber of this embodiment is a single-mode fiber which propagates light exclusively in the first order mode, while the second fiber is a double-mode (two-mode) fiber which propagates light exclusively in the first and second order modes. Also, in the preferred embodiment, one of the two propagation modes having the matching propagation velocities is a higher order mode than the other of the two modes having the matching propagation velocities. This embodiment may additionally include means for controlling the orientation of the energy distribution pattern in the higher order mode to thereby control the coupling between the two modes.

Preferably, the cladding is removed from each of the two fibers so that only a small amount of cladding remains between the oval cladding surfaces of each fiber and the core of each fiber. Thus, the coupling between the two fibers is accomplished through evanescent field interaction between the matched modes of the two fibers.

BRIEF DESCRIPTION OF THE DRAWINGS

FIG. 1 is a cross sectional view of the apparatus of the present invention showing a double-mode fiber and a single mode fiber juxtaposed in a directional coupler.

FIG. 2 is a perspective view of the coupler halves which comprise the present invention, and shows the facing surfaces formed on the fibers mounted in each coupler half.

FIG. 3 is a cross-sectional end view taken along the lines 3—3 in FIG. 1 showing the positional relationship between the cores and the claddings of the two fibers in FIG. 1.

FIG. 4a is a cross-sectional view of the single-mode optical fiber taken along the lines 4a–4a in FIG. 1.

FIG. 4b is a graphical representation of the electric field energy distribution of an optical signal propagating in the $LP_{01}$ mode of the single-mode optical fiber in FIG. 4a.

FIG. 5a is a cross-sectional view of the double mode fiber taken along the lines 5a–5a in FIG. 1.

FIG. 5b is a graphical representation of the electrical field energy distribution of the $LP_{01}$ propagation mode and the $LP_{11}$ propagation mode of an optical signal propagating in the double-mode fiber of FIG. 5a.

FIG. 6a shows the single-mode optical fiber and the double-mode optical fiber in juxtaposed relationship at their facing surfaces.

FIG. 6b graphically illustrates the interaction of the evanescent fields of the $LP_{11}$ propagation mode of the double-mode optical fiber with the $LP_{01}$ propagation mode of the single-mode optical fiber.

FIG. 7a is a graphical representation of the waveform of an optical signal propagating in the $LP_{01}$ mode of the single-mode optical fiber.

FIG. 7b is a graphical representation of the waveform of an optical signal propagating in the $LP_{01}$ mode of the double-mode optical fiber.

FIG. 7c is a graphical representation of the waveform of an optical signal propagating in the $LP_{11}$ mode of the double-mode optical fiber.

FIG. 8a pictorially illustrates mismatched phase propagation velocities of the single-mode and double-mode optical fibers when the core axes are parallel.

FIG. 8b pictorially illustrates the matching of phase propagation velocities by positioning one of the optical fibers at an angle with respect to the core axis of the other optical fiber.

DESCRIPTION OF THE PREFERRED EMBODIMENT

Figure 9:
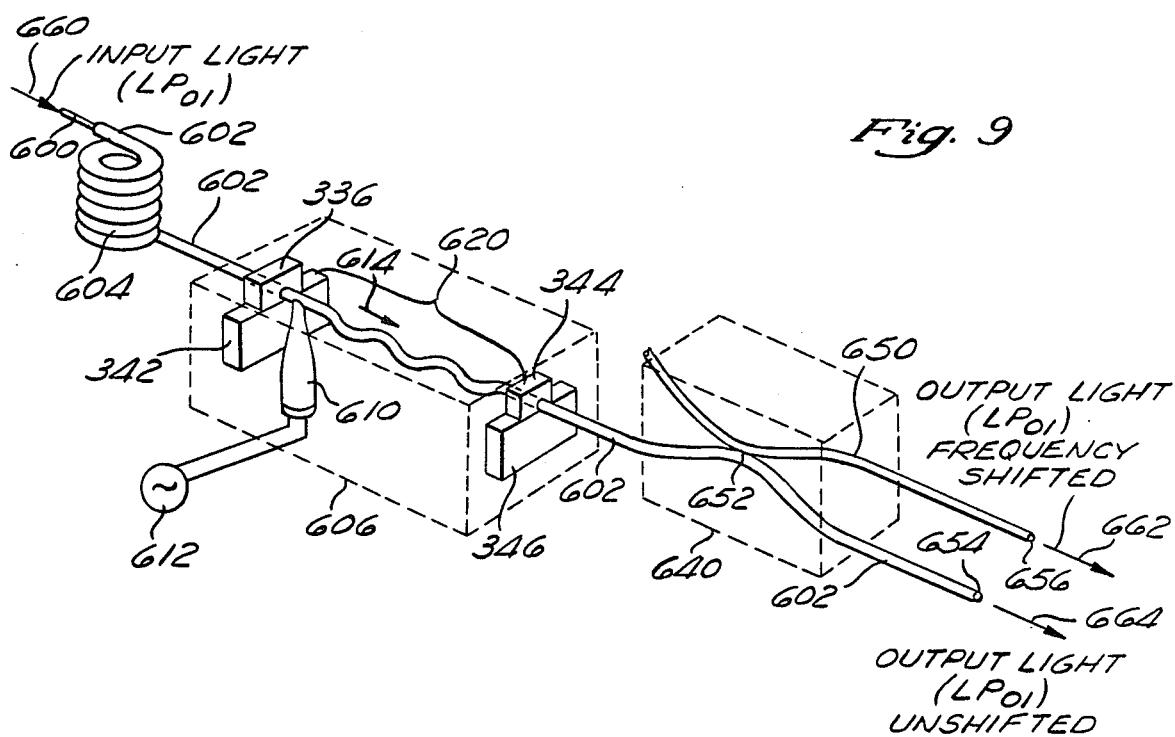
FIG. 9 is a pictorial illustration of an inter-mode modulator that uses the apparatus of the present invention to separate frequency-shifted light in the $LP_{11}$ propagation mode from unshifted light in the $LP_{01}$ propagation mode.

As shown in FIGS. 1-5b, the present invention comprises a first optical fiber 100 and a second fiber 110. The first optical fiber 100 has an inner core 102 and an outer cladding 104. The second optical fiber 110 has an inner core 112 and a outer cladding 114. The core 102 of the first optical fiber 100 has a core refractive index $n_{core1}$, and the cladding 104 has a cladding refractive index $n_{cladding1}$. The core refractive index and the cladding refractive index of the first fiber 100 are chosen such that the core refractive index is greater than the cladding refractive index (i.e., $n_{core1} > n_{cladding1}$). Therefore, light propagating in the core 102 will propagate at a slower phase velocity than light propagating in the cladding 104. In like manner, the core 112 of the second optical fiber 110 has a core refractive index $n_{core2}$ and the cladding 114 has a cladding refractive index cladding $n_{cladding2}$ which are selected so that the core refractive index is greater than the cladding refractive index (i.e., $n_{core2} > n_{cladding2}$). In the preferred embodiment, the core refractive index, the cladding refractive index, and the diameter of the core of the first optical fiber 100 are selected so that the first optical fiber 100 is a single-mode optical fiber at a selected optical frequency $f_o$.

The core refractive index, the cladding refractive index, and the diameter of the core of the second optical fiber 110 are selected so that the second optical fiber 110 is a double-mode (i.e. a two-mode) optical fiber at the same selected optical frequency $f_o$. Thus, the first optical fiber 100 will propagate only light in the first order $LP_{01}$ mode at the selected optical frequency. The second optical fiber 110 will propagate light in the first order $LP_{01}$ mode and will also propagate light in a higher order mode, namely, the second order $LP_{11}$ propagation mode.

The first optical fiber 100 is arcuately mounted in a first mounting block 120. The second optical fiber is arcuately mounted in a second mounting block 130. In the preferred embodiment, the first and second mounting blocks 120, 130 are constructed in accordance with the teachings of U.S. Pat. No. 4,536,058, which is incorporated herein by reference. The first mounting block 120 has a flat mounting surface 140 into which an arcuate slot 142 is cut to provide a guide for the first optical fiber 100. As described in U.S. Pat. No. 4,536,058, the slot 142 has a depth with respect to the mounting surface 140 at each of two ends of the first mounting block 120 that is greater than the depth at the middle of the mounting surface 140 so that when the first optical fiber 100 is positioned in the slot 142, a portion of the cladding 104 on one side of the first optical fiber 100 is proximate to the mounting surface 140. The mounting surface 140 is polished so that the cladding 104 of the first optical fiber 100 is gradually removed with the surface 140 to form a facing surface 144 on the cladding 104 which has a general oval shape that is coplanar with the surface 140, as illustrated in FIG. 2. The polishing is continued until a sufficient amount of the cladding 104 is removed so that the facing surface 144 is within a few microns of the core 102 of the first optical fiber 100. In like manner, an arcuate slot 152 is formed in a mounting surface 150 of the second mounting block 130 and the second optical fiber 110 is positioned in the slot 152. The mounting surface 150 and the cladding 114 of the second fiber 110 are polished in the above-described manner to form a facing surface 154.

As illustrated in FIG. 3, the facing surface 144 of the first optical fiber 100 is positioned in juxtaposed relationship with the facing surface 154 of the second optical fiber 110 to form an interaction region 156 for transferring light between the fibers. The core 102 of the first optical fiber 100 and the core 112 of the second optical fiber 110 are spaced apart by the thin layer of the cladding 104 remining between the facing surface 144 and the core 102, and the thin layer of the cladding 114 remaining between the facing surface 154 and the core 112. The removal of the cladding is preferably performed in accordance with the method described in U.S. Pat. No. 4,536,058. The oil drop test described in U.S. Pat. No. 4,536,058 is advantageously used to determine the amount of cladding removed and the proximity of the facing surfaces 144, 154 to the cores 102, 112 respectively. As discussed hereinafter, cladding is removed from the first fiber 100 and the second fiber 110 until the evanescent field penetration of the facing surfaces 144,154 for the selected guided modes of the fibers is sufficient to cause coupling of light between the two guided modes.

When the facing surface 144 and the facing surface 154 are superimposed, as illustrated in FIG. 1, the first fiber 100 and the second fiber 110 converge near the center of the mounting blocks 120 and 130 and diverge gradually as the distance away from the center of the blocks 120 and 130 increases. The rate of convergence and divergence of the two fibers is determined by the radius of curvature of the two arcuate grooves, which, in one preferred embodiment, is selected to be 25 centimeters. This radius of curvature permits the cores of the two fibers to be positioned in close proximity to permit the evanescent fields to interact while limiting the length of the interaction region 156. As explained in detail by Digonnet, et al, in "Analysis of Tunable Single Mode Optical Fiber Coupler," *IEEE Journal of Quantum Electronics,* Vol QE-18, No. 4, April 1982, pp. 746–754, and in U.S. Pat. No. 4,556,279, the teachings of which are incorporated herein by reference, the length of an interaction region of two juxtaposed fibers is defined principally by the radii of curvature of the fibers, while the strength of coupling is defined principally by the proximity of the cores in the interaction region, particularly the minimum core spacing (i.e., the distance between the cores at the centers of the facing surfaces 144 and 154). The length of the interaction region is preferably at least an order of magnitude larger than the core diameter of either of said fibers so that there is a substantial amount of light transferred, and preferably a complete transfer of light between the two fibers. The interaction region length increases with increasing radii of curvature and the strength of coupling increases with decreasing core spacing. The radii of curvature are preferably selected to be sufficiently large so that little, if any bending effect is introduced into the fibers. Further, the core spacing is preferably no less than zero so that the diameters of the cores 102, 112 are uniform throughout the length of the apparatus of the invention, and, thus, no modal perturbations are introduced by changes in the characteristics of the fiber.

The operation of the present invention can be more fully understood by referring to FIGS. 4a–b, 5a–b, 6a–b, 7a–c, and 8a–b. FIGS. 4a and 4b illustrate the electric field intensity distribution for the $LP_{01}$ propagation mode of an optical signal propagating in the single-mode optical fiber 100. As illustrated in FIG. 4b, the field intensity distribution is defined by an electric field intensity distribution graph 200 which has a maximum 202 substantially in the center of the core 102. The intensity decreases as the distance from the center of the core 102 increases. Most of the electric field energy of the $LP_{01}$ propagation mode is concentrated in the core 102 of the fiber 100. However, a portion of the electric field energy extends into the cladding 104, as illustrated by a field portion 204 and a field portion 206 of the graph 200. The portion of the electric field energy outside the core 102 is referred to as the evanescent field. The interaction of the evanescent fields of two guided modes within the interaction region 156 provides the means for coupling optical energy between the two fibers 100, 110, as described in U.S. Pat. No. 4,536,058. The amount of coupling is determined principally by the length of the interaction region and the distance between the respective cores of the two fibers.

FIGS. 5a and 5b illustrate the electric field intensity distribution for light propagating in the $LP_{01}$ and $LP_{11}$ modes of the double-mode fiber 110 at the selected frequency. The electric field intensity distribution of the $LP_{01}$ propagation mode is illustrated by a graph 220, and the electric field distribution of the $LP_{11}$ propagation mode is illustrated by graph 222. As discussed above with regard to the graph 200 in FIG. 4b, the electric field of an optical signal propagating in the $LP_{01}$ propagation mode is concentrated in the core 112 near the center of the fiber 110, as illustrated by a maximum 224, and the intensity diminishes as the distance from the center of the core 112 increases. A portion of the electric field intensity distribution of the $LP_{01}$ propagation mode extends into the cladding 114 as an evanescent field, designated as portions 226 and 228.

The electric field intensity distribution graph 222 for the light propagating in the $LP_{11}$ propagation mode has a minimum intensity 230 near the center of the core 112 and the intensity increases gradually as the distance from the core 112 increases. The maximum electric field intensity occurs at maxima 232 and 234 which are proximate to the interface between the core 112 and the cladding 114 of the optical fiber 110. Thus, the evanescent field of an optical signal propagating in the $LP_{11}$ propagation mode, represented by electric field energy distribution portions 236 and 238, extends further into the cladding than the evanescent field of the portion of an optical signal propagating in the $LP_{01}$ mode of the second optical fiber 110.

As illustrated in FIG. 5b, the optical signal propagating in the $LP_{01}$ propagation mode of the second optical fiber 110 has very little evanescent field extending beyond the core 112 of the fiber 110 (see the portions 226 and 227 of the graph 220). In contrast, the evanescent field of an optical signal propagating in the $LP_{11}$ propagation mode extends well into the cladding 114 of the second optical fiber 110 (see the portions 236 and 238 of the graph 222). Thus, when a portion of the cladding is removed from each of the two optical fibers so that the cores 112 and 102 can be closely juxtaposed, there is a relatively large evanescent field intensity for the $LP_{11}$ propagation mode available to interact with the core 102 of the first optical fiber 100. This is illustrated in FIGS. 6a and 6b, wherein the electric field intensity distribution graphs 220 and 222 of the second optical fiber 110 are shown in relation to the electric field intensity distribution graph 200 of the first optical fiber 100 when the two fibers are juxtaposed at their respective facing surfaces 154 and 144. As illustrated, there is substantially no overlap of the $LP_{01}$ electric field intensity distribution 220 of the second optical fiber 110 with the $LP_{01}$ electric field intensity distribution 200 for of the first optical fiber 100. However, there is relatively large overlap of the evanescent field portion 238 of the $LP_{11}$ electric field intensity distribution 222 of the second optical fiber 110 with the evanescent field portion 204 of the $LP_{01}$ electric field intensity distribution 200 of the first optical fiber 100. Thus, the $LP_{11}$ propagation mode of the second optical fiber 110 and the $LP_{01}$ propagation mode of the first optical fiber 110 interact strongly as compared to the interaction between the $LP_{01}$ modes of the two fibers. It has been found that, in one embodiment, when the spacing between the cores of the two fibers is selected to be approximately 2.5 times the radius of the core 112 of the second optical fiber 110, the electric field amplitude of the $LP_{11}$ mode is greater than 10 times the electric field amplitude of the $LP_{01}$ mode of the second optical fiber 110 at a normalized frequency of $V=2.6$. Due to the strong interaction between the $LP_{11}$ mode of the double-mode fiber 110 and the $LP_{01}$ mode of the single-mode fiber 100, a relatively large amount of optical energy is coupled between the $LP_{11}$ propagation mode of the fiber 110 and the $LP_{01}$ propagation mode of the fiber 100. However, since there is substantially no interaction between the $LP_{01}$ modes of the two fibers 100, 110, there is substantially no optical energy coupled between the $LP_{01}$ propagation mode of the fiber 110 and the $LP_{01}$ mode of the fiber 100. As discussed hereinafter, coupling between the $LP_{11}$ mode of the fiber 110 and the $LP_{01}$ mode of the fiber 100 is enhanced by selecting the fibers such that the propagation constants of these two modes are the same. Similarly, coupling between the $LP_{01}$ modes of the fibers is inhibited by ensuring that the $LP_{01}$ modes of the fibers have substantially different propagation constants.

Figure 12:
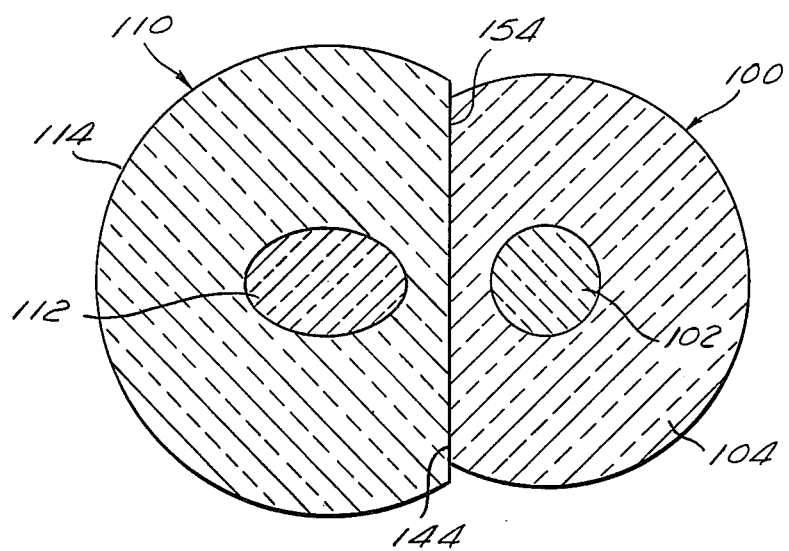
FIG. 12 shows a first optical fiber and a second optical fiber having an elliptical core in juxtaposed relationship.

One skilled in the art will recognize that the electric field intensity distribution of the $LP_{11}$ propagation has a lobe pattern which varies with the orientation of the double-mode optical fiber 110. In order to obtain maximum coupling, one of the lobes should be oriented to be adjacent to the facing surface 154 so that the lobe is proximate to the single-mode optical fiber 100. One means of orienting the lobes for maximum coupling is to use a fiber phase shifter (not shown) to adjust the phase of the four true eigenmodes that make up the $LP_{11}$ mode approximation. In a preferred embodiment, illustrated in FIG. 12, the double-mode optical fiber 110 is an elliptical core double-mode fiber in which the true eigenmodes are lobe-like in shape. The eigenmodes propagate down the fiber without changing so that the lobe pattern for the $LP_{11}$ propagation mode can be oriented to allow for maximum coupling to the single-mode fiber 100. The lobe pattern for the $LP_{11}$ mode is adjusted, using a polarization controller or the like, for maximum coupling while passing through the evanescent coupling region.

As discussed above, the energy of an optical signal propagating in the $LP_{01}$ mode of a fiber is confined mostly within the core of the fiber. Thus, an optical signal in the $LP_{01}$ propagation mode propagates at a phase propagation velocity which is largely determined by the refractive index of the core of the fiber. The effective refractive index seen by the light propagating in the $LP_{01}$ propagation mode has a value close to the value of the refractive index of the core. In contrast to the $LP_{01}$ mode, the $LP_{11}$ propagation mode propagates a larger fraction of optical energy in the cladding of the fiber. Thus, the phase propagation velocity of an optical signal propagating in the $LP_{11}$ propagation mode is determined by an effective refractive index which has a value less than the refractive index of the core and greater than the refractive index of the cladding. Accordingly, the effective refractive index for light in the $LP_{11}$ propagation mode has a value which is less than that for light in the $LP_{01}$ propagation mode. Thus, the phase propagation velocity of an optical signal propagating in the $LP_{11}$ propagation mode is faster than the phase propagation velocity of an optical signal propagating in the $LP_{01}$ mode. Due to the difference in phase velocities of the $LP_{01}$ and $LP_{11}$ modes, these modes do not easily couple; rather, they tend to function as two independent optical paths. In the preferred embodiment, selective coupling between the $LP_{11}$ mode of the fiber 110 and the $LP_{01}$ mode of the fiber 100 is accomplished by utilizing dissimilar fibers such that the phase propagation velocity of the $LP_{11}$ mode of the fiber 110 matches the phase propagation velocity of the $LP_{01}$ mode of the fiber 100, while the phase propagation velocities of all other pairs of modes are not matched.

From the foregoing, it will be understood that the propagation velocity of an optical signal propagating in the $LP_{01}$ mode of the first (single-mode) optical fiber 100 is determined in part by a combination of the refractive index of the core 102, the refractive index of the cladding 104, and the diameter of the core 102. Similarly, the phase propagation velocities of optical signals propagating in the $LP_{01}$ mode and the $LP_{11}$ mode of the second (double-mode) optical fiber 110 are determined by the combination of the refractive index of the core 122, the refractive index of the cladding 124, and the diameter of the core 122. As set forth above, the phase propagation velocity of an optical signal propagating in the $LP_{11}$ mode in the optical fiber 110 will be greater than the phase propagation velocity of an optical signal propagating in the $LP_{01}$ mode of the optical fiber 110. In the present invention, the first optical fiber 100 and the second optical fiber 110 are selected to have characteristics (i.e., refractive indices and core diameters) such that the phase propagation velocity of an optical signal in the $LP_{11}$ propagation mode of the second optical fiber 110 is matched to the phase propagation velocity of an optical signal in the $LP_{01}$ propagation mode of the first optical fiber 100. Thus, the phase propagation velocity of an optical signal propagating in the $LP_{01}$ mode in the second optical fiber will be slower than the phase propagation velocity of an optical signal propagating in the $LP_{11}$ mode of the second optical fiber 110 and will also be slower than the phase propagation velocity of an optical signal propagating in the $LP_{01}$ mode of the first optical fiber 100. The relationship among the phase propagation velocities is illustrated in FIGS. 7a, 7b, and 7c.

In FIG. 7a, a traveling wave 250 represents the phase propagation of a signal propagating in the $LP_{01}$ propagation mode of the first (single-mode) optical fiber 100. The traveling wave 250 has a first wavelength $L_1$ which is defined by a velocity $V_1$ of the optical signal in the $LP_{01}$ propagation mode of the fiber 100 and the selected optical frequency $f_o$ (i.e., $L_1 = V_1/f_o$). Similarly, FIG. 7b illustrates a traveling wave 252 that represents the phase propagation of a signal traveling in the $LP_{01}$ propagation mode of the second (double-mode) optical fiber 110 at the selected optical frequency $f_o$. The traveling wave 252 has a wavelength $L_2$ which is defined by a velocity $V_2$ of the optical signal in the $LP_{01}$ propagation mode of the second optical fiber 110 and the selected optical frequency $f_o$ (i.e., $L_2 = V_2/f_o$). FIG. 7c illustrates a traveling wave 254 which represents the phase propagation of a signal traveling in the $LP_{11}$ propagation mode of the optical fiber 110 at the selected optical frequency $f_o$. The travelling wave 254 has a wavelength $L_2$ which is defined by a velocity $V_3$ of the optical signal in the $LP_{11}$ propagation mode of the second optical fiber 110 and the selected optical frequency $f_o$ (i.e., $L_3 = V_3/f_o$). As set forth above, the characteristics of the first optical fiber 100 and the second optical fiber 110 are chosen so that the velocity $V_1$ is substantially equal to the velocity $V_3$. Thus, the velocity $V_2$, which must be less than the velocity $V_3$, is less than the velocity $V_1$. Therefore, the wavelength $L_3$ matches the wavelength $L_1$ and the wavelength $L_2$ does not match the wavelength $L_1$. Accordingly, as illustrated in FIGS. 7a and 7c, light travelling in the $LP_{11}$ propagation mode of the second optical fiber 110 will have a substantially fixed phase relation to light travelling in the $LP_{01}$ propgation mode of the first optical fiber 100. On the other hand, as illustrated in FIGS. 7a and 7b, light traveling in the $LP_{01}$ propagation mode of the second optical fiber 110 will have a continually varying phase relation to light travelling in the $LP_{01}$ propagation mode of the first optical fiber 100.

It has been shown that to couple light from a mode of one fiber to a mode of another fiber, the modes should interact through their evanescent fields over an interaction length and the phase propagation velocities of the two optical signals should be substantially equal. In the preferred embodiment, the phase propagation velocity $V_3$ of the $LP_{11}$ propagation mode of the second optical fiber 110 at the selected frequency is substantially equal to the phase propagation velocity $V_1$ of the $LP_{01}$ propagation mode of the first optical fiber 100. Thus, the apparatus of the present invention provides a means for coupling optical energy between the $LP_{11}$ propagation mode in the second optical fiber 110 and the $LP_{01}$ propagation mode in the first optical fiber 100. An optical signal propagating in the $LP_{01}$ propagation mode in the second optical fiber 110 is not coupled to the first optical fiber 100 because the phase propagation velocity $V_2$ for light propagating in the $LP_{01}$ mode in the second optical fiber 110 does not match the phase propagation velocity $V_2$ for light propagating in the $LP_{01}$ propagation mode of the first optical fiber 100. Thus, the apparatus of the present invention provides selection between optical energy propagating in the $LP_{01}$ mode of the second optical fiber 110 and optical signal propagating in the $LP_{11}$ mode of the second optical fiber 110. Accordingly, as shown in FIG. 1, when optical energy is input into a first end 300 of the second optical fiber 110 in the $LP_{01}$ propagation mode, represented by an arrow 302, and in the $LP_{11}$ propagation mode, represented by an arrow 304, the optical energy in the $LP_{11}$ propagation mode will be coupled to the first optical fiber 100 and will exit from an end 310 of the first optical fiber 100 in the $LP_{01}$ propagation mode of the first optical fiber 100, as represented by an arrow 312. In contrast, the optical energy in the $LP_{01}$ propagation mode of the second optical fiber 110 will remain in the second optical fiber 110 and will exit from a second end 320 of the second optical fiber 110, as represented by an arrow 322. The first optical fiber 100 therefore provides an output signal which corresponds to the optical signal incident to the interaction region 156 of the two fibers propagating in the $LP_{11}$ propagation mode of the second optical fiber 110.

The foregoing properties of the present invention are reciprocal in that an optical signal introduced into an end of the first optical fiber 100 in the $LP_{01}$ propagation mode of the first optical fiber 100 interacts with the $LP_{11}$ propagation mode of the second optical fiber 110 in the interaction region between the first facing surface 144 and the second facing surface 154 to couple optical energy into the $LP_{11}$ propagation mode of the second optical fiber 110. This reciprocal effect has advantages in many applications.

The apparatus of the present invention can be finetuned by orienting the two fibers 100, 110 so that the longitudinal axes of the two fibers are not exactly parallel. Thus, if the phase propagation velocities $V_1$ and $V_3$ are not precisely the same at the selected frequency, the second optical fiber 110, for example, can be positioned so that the longitudinal axis of the core 112 of the second optical fiber 110 is at an angle with respect to the longitudinal axis of the core 102 of the first optical fiber 100 such that the magnitude of the component of the phase velocity $V_3$ in the direction of the longitudinal axis of the core 102 of the first optical fiber 100 is the same as the phase velocity $V_1$ along the longitudinal axis of the core 102 of the first optical fiber 100. This is illustrated in FIGS. 8a and 8b, wherein a vector 402 represents the phase propagation velocity $V_3$ of the $LP_{11}$ propagation mode of the second optical fiber 110 (shown in phantom) and a vector 402 represents the phase propagation velocity $V_1$ of the propagation mode $LP_{01}$ in the first optical fiber 100 (shown in phantom). In FIG. 8a, the two vectors are positioned in parallel and the magnitude of the vector 400 is smaller than the magnitude of the vector 402. Thus, the phase propagation velocities $V_3$ and $V_1$ do not match and efficient coupling cannot occur. In FIG. 8b, the second optical fiber 110 is oriented at a small angle with respect to the first optical fiber 100 so that the phase propagation velocity vector 400 is oriented at a small angle with respect to the phase propagation velocity vector 402. The component of the phase propagation velocity vector 402 in the direction of the phase propagation velocity vector 400 is shown in dashed lines as a vector 402' that represents a velocity $V_3'$. The vector 402' has substantially the same magnitude as the vector 400 and thus the phase propagation velocities $V_3'$ and $V_1$, represented by the vectors 402' and 400, match at the angle shown. Thus, efficient coupling can occur from the $LP_{11}$ propagation mode of the second optical fiber 110 to the $LP_{01}$ propagation mode of the first optical fiber 100. Although, for clarity of illustration, the angle between the fibers is shown as a significant angle in FIG. 8b, it is preferable that the angle between the two fibers 100 and 110 be very small so that the fibers are substantially parallel at the interaction region 156. In the present invention, it is desirable to avoid large angles between the fibers to prevent a significant reduction in the interaction length. As used herein, the interaction length means the length in the direction of the fiber axis of one of the fibers (e.g., the fiber 100) through which the core of the one fiber (e.g., the fiber 100) is positioned within the evanescent field of the other fiber (e.g., the fiber 110).

An exemplary application for the present invention is illustrated for an inter-mode frequency shifter 500 in FIG. 9. The inter-mode frequency shifter 606 preferably includes an input optical fiber 600 which is advantageously a single-mode optical fiber. The input optical fiber 600 is butt-spliced to a double-mode optical fiber 602. A first portion of the double-mode optical fiber 602 is formed into a coil 604 which operates as a mode stripper in a manner known to the art. A second portion of the double-mode optical fiber 602 interconnects the mode stripper 604 with an inter-mode frequency shifter 606. The inter-mode frequency shifter 606 is preferably constructed in accordance with copending patent application Ser. No. 820,513 (now abandoned), entitled "Fiber Optic Inter-mode Coupling Single Side Band Frequency Shifter," filed on the same day as the instant application, and assigned to the assignee of the instant application, the disclosure of which is hereby incorporated by reference. A transducer 610 induces vibrations into the fiber 602 which propagate in a single direction 614 away from the transducer 610 as a flexure wave comprising a series of traveling microbends. The intermode frequency shifter 606 operates to couple light from a first propagation mode (e.g., the $LP_{01}$ mode) to a second propagation mode (e.g., the $LP_{11}$ mode) and to cause the light to be shifted in frequency by an amount determined by a modulation signal applied to the transducer 610 of the frequency shifter 606 from a modulation source 612. After passing through the frequency shifter 606, the double-mode optical fiber 602 interconnects the frequency shifter 606 with a mode selector 640 constructed in accordance with the present invention. In the mode selector 640, the double-mode optical fiber 602 is juxtaposed with a single mode optical fiber 650 at an interaction region 652 in the manner described above. The double-mode optical fiber 602 has an output end portion 654. The single mode optical fiber 650 has an output end portion 656.

The inter-mode frequency modulator operates in the following manner. An optical signal, represented by an arrow 660, is introduced into the input optical fiber 600. Preferably, the optical signal is propagating solely within the $LP_{01}$ propagation mode for the input optical fiber 600. The optical signal propagates through the input optical fiber 600 and is coupled to the double-mode optical fiber 602 and propagates within the double-mode optical fiber 602 in the $LP_{01}$ propagation mode. Any optical signal propagating in the $LP_{11}$ propagation mode in the fiber 602 is stripped from the double-mode optical fiber 602 in the mode stripper 604 in a manner known to the art. Thus, after passing through the mode stripper 604, the optical signal remaining in the double-mode optical fiber 602 is propagating solely in the $LP_{01}$ propagation mode. The optical signal propagates in the $LP_{01}$ propagation mode through the double-mode optical fiber 602 to the frequency shifter 606. In the frequency shifter 606, the optical signal propagating in the $LP_{01}$ propagation mode is coupled to the $LP_{11}$ propagation mode and is shifted in frequency by an amount determined by the frequency of the modulation source 612. As set forth in the above-referenced co-pending application Ser. No. 820,513 (now abandoned), the optical signal coupled to the $LP_{11}$ propagation mode can be shifted upward in frequency or downward in frequency in accordance with the direction of propagation of traveling flexure waves in the frequency shifter 606. The frequency shifted light in the $LP_{11}$ propagation mode and any light remaining in the $LP_{01}$ propagation mode propagates from the frequency shifter 606 to the mode selector 640 through the double-mode optical fiber 602. Within the mode selector 640, the light propagating in the $LP_{11}$ propagation mode is coupled to the $LP_{01}$ propagation mode of the single-mode optical fiber 650 and propagates to the end portion 656 where it exits as frequency shifted light, represented by the arrow 662. The light propagating in the $LP_{01}$ mode in the fiber 602 at the original unshifted frequency propagates to the end portion 654 of the double-mode optical fiber 602 and exits as unshifted light, represented by an arrow 654.

As set forth above, the mode selector 640 of the present invention is reciprocal so that an optical signal can be input into the end portion 656 of the optical fiber 650 in the $LP_{01}$ propagation mode. The light in the $LP_{01}$ propagation mode of the single-mode optical fiber 650 is coupled to the $LP_{11}$ propagation mode of the double-mode optical fiber 602 within the mode selector 640. Thereafter, the light propagates through the optical fiber 602 to the frequency shifter 606 where it is shifted in frequency and is coupled to the $LP_{01}$ mode of the optical fiber 602. The optical signal propagates from the frequency shifter 602 through the the optical fiber 602 to the mode stripper 604 wherein any optical signal remaining in the $LP_{11}$ propagation mode is stripped from the optical fiber 602. Thus, the optical signal propagating from the mode stripper 604 to the single-mode optical fiber 600 (which now operates as an output optical fiber) is propagated solely in the $LP_{01}$ propagation mode and is shifted in frequency from the optical signal input at the end portion 656 of the optical fiber 650.

Figure 10:
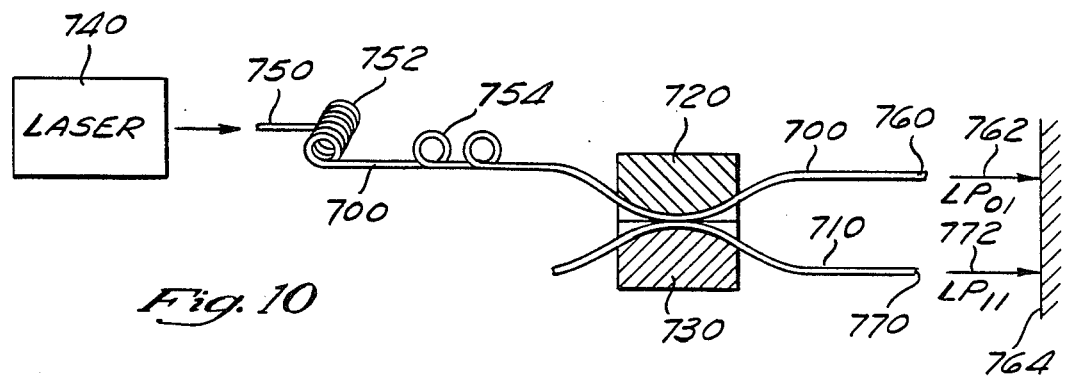
FIG. 10 is a system incorporating the device of the present invention to verify the modal selection capability of the device.

Although described above with regard to a single-mode fiber and a double-mode fiber, the present invention can also be used to selectively couple optical energy between modes in two dissimilar multimode fibers. For example, optical energy can be coupled from the $LP_{01}$ mode of a first double-mode fiber to the $LP_{11}$ mode of a second double-mode optical fiber. This is illustrated in FIG. 10 for a first double-mode fiber 700 and a second multimode fiber 710. The fibers 700, 710 are selected such that the phase propagation velocity of an optical signal in the $LP_{01}$ mode of the first double-mode fiber 700 is substantially equal to the phase propagation velocity of the $LP_{11}$ propagation mode of the second double-mode fiber 710. The first fiber 700 and the second fiber 710 are constructed in accordance with the present invention, as described above, by positioning the two fibers in a first coupler half 720 and a second coupler half 730, forming first and second facing surfaces on the two fibers, and juxtaposing the two fibers at the facing surfaces, as illustrated pictorially in FIG. 10. In one embodiment, the two fibers are made by ITT. The first fiber 700 has a core with a diameter of approximately 3.8 microns and has a numerical aperture of 0.12. The second fiber has a core diameter of 5.6 microns and has a numerical aperture of approximately 0.08. Both fibers have cutoff wavelengths on the order of 580 nanometers. An Argon Ion laser 740 is used as a source of optical energy at a wavelength of 4,880 Angstroms. At that wavelength, both the first fiber 700 and the second fiber 710 propagate optical energy in both the first and second order modes. The optical signal from the laser 740 is provided as an input signal to a first end 750 of the first fiber 700. In order to operate the first fiber 700 in accordance with the present invention, a portion of the first optical fiber 700 is formed into a mode stripper 752, which employs tight bends to remove any energy propagating in the second order $LP_{11}$ mode. Thus, the only energy propagating to the portion of the first fiber 700 in the coupler half 720 is in the $LP_{01}$ propagation mode. The embodiment of FIG. 10 preferably includes a polarization controller 754 between the mode stripper 752 and the coupler half 720 so that the polarization of the optical energy in the $LP_{01}$ propagation mode incident to the coupler half 720 is controllable. As described above, the light incident to the portion of the first fiber 700 in the coupler 720 in the $LP_{01}$ propagation mode is coupled to the second fiber 710 in the $LP_{11}$ propagation mode. The phase velocity of the $LP_{01}$ propagation mode in the second fiber 710 does not match the phase propagation velocity of the optical energy in the $LP_{01}$ propagation mode of the first optical fiber 700. Thus, substantially no optical energy is transferred to the $LP_{01}$ propagation mode of the second optical fiber 710.

The light propagating in the first optical fiber 700 after passing through the coupler half 720 is output from a second end 760 of the first optical fiber 700, as indicated by an arrow 762, and is projected onto a screen 764 where the field pattern of the output light can be observed. Similarly, the light coupled to the second optical fiber 710 is output from an end 770 of the second optical fiber 710, as indicated by an arrow 772, and is also projected onto the screen 764. Observations of the field patterns thus projected onto the screen 764 in embodiments constructed in accordance with FIG. 10 show that the field pattern generated by the light output from the end 760 of the first optical fiber 700 corresponds to the $LP_{01}$ mode pattern. Similarly, the light projected onto the screen 764 from the end 770 of the second optical fiber 710 corresponds to the field pattern for an $LP_{11}$ propagation mode.

Measurement of the power from the light output from the second end 760 of the first optical fiber 700 and the light output from the end 770 of the second optical fiber 710 has shown that a coupling efficiency of at least 97% can be obtained. This coupling efficiency is calculated by dividing the coupled power (i.e., the power output from the end 770 of the second multimode optical fiber 710) by the sum of the coupled power and the uncoupled power (i.e., the power of the light output from the second end 760 of the first multimode optical fiber 700). The distance between the fiber cores can be adjusted, by laterally displacing the fibers, as described in U.S. Pat. No. 4,536,058, to adjust the coupling efficiency from zero to 97%.

Figure 11:
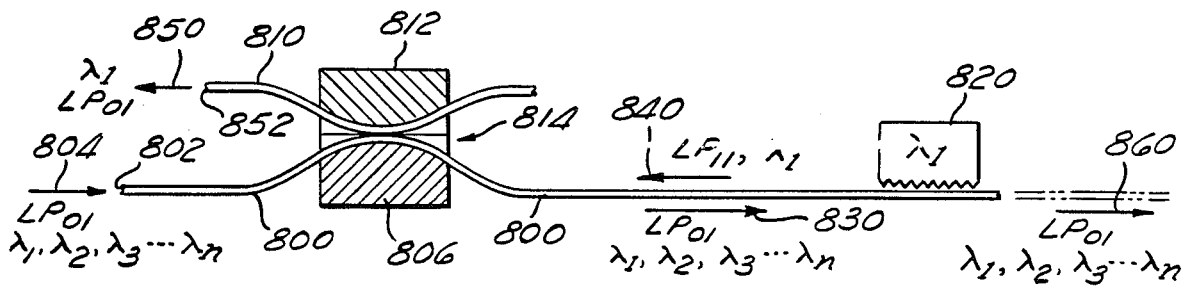
FIG. 11 is a system incorporating the present invention and an evanescent field grating reflector that separates light propagating at a particular frequency from light at other frequencies.

FIG. 11 illustrates a system which incorporates a mode selector built in accordance with the present invention into a system that separates light propagating at a plurality of frequencies in one fiber into a plurality of light signals at discrete frequencies propagating in separate fibers. The system includes a first optical fiber 800 which, in the embodiment shown, has only two propagation modes. This fiber 800 includes a first end 802 which receives input light, represented by an arrow 804. The input light 804 is comprised of a plurality of optical signals having discrete optical wavelengths $\lambda_1$, $\lambda_2$, ... $\lambda_n$. Preferably, the optical signals are propagating in the $LP_{01}$ propagation mode of the fiber. A portion of the optical fiber 800 is positioned in a coupler half 806 constructed in accordance with the present invention. A second optical fiber 810, which is preferably a single-mode optical fiber, is positioned in a second coupler half 812, also constructed in accordance with the present invention. The two coupler halves 806, 812 are positioned so that facing surfaces formed on the fibers 800 and 810 are juxtaposed to provide coupling between the propagation modes of the two fibers and thereby form a mode selector 814 of the present invention. A second portion of the first optical fiber 800 is incorporated into an evanescent field grating reflector 820, constructed in accordance with copending U.S. patent application Ser. No. 754,271 (now abandoned), entitled "Optical Fiber Evanescent Grating Reflector," filed on July 15, 1985, and assigned to the assignee of the instant application. This application is incorporated herein by reference. As disclosed in the copending application, by properly selecting the periodicity of the grating of the grating reflector 820, light incident on the grating reflector in the $LP_{01}$ propagation mode of the optical fiber 800 as represented by an arrow 830, is reflected by the grating reflector 820 and is caused to propagate in the reverse direction in the $LP_{11}$ propagation mode, as illustrated by an arrow 840. As set forth in the copending patent application, the grating reflector 820 can be constructed to have a series of periodic gratings with a periodicity of $\Lambda$, (wherein $\Lambda$ is the distance between parallel lines forming the grating) so that light incident upon the grating reflector 820 in the $LP_{01}$ mode with a wavelength of $\lambda_{01}$ (wherein $\lambda_{01}$ refers to the wavelength at the input frequency in the $LP_{01}$ propagation mode) will be reflected back into the fiber 802 in the opposite direction at a wavelength $\lambda_{11}$ which corresponds to the wavelength of a signal at the same frequency in the $LP_{11}$ propagation mode. In order to achieve this reflection characteristic, the periodicity $\Lambda$ of the grating reflector 820 is selected in accordance with the following equation:

$$\frac{1}{\Lambda} = \frac{1}{\lambda_{01}} + \frac{1}{\lambda_{11}} \quad (1)$$

As set forth in the copending patent application, the grating reflector 820 acts as an inter-mode coupler when the periodicity of the grating is selected in accordance with Equation 1. The grating reflector 820 is particularly advantageous in that it is frequency selective and can separate light propagating in a plurality of frequencies such that the light propagating in the reverse direction, represented by the arrow 806, will only have a selected one of the plurality of frequencies. That frequency (having a wavelength $\lambda_1$, representing the freespace wavelength of an optical signal at the selected frequency) is the frequency wherein the $LP_{01}$ mode wavelength $\lambda_{01}$ and the $LP_{11}$ mode wavelength $\lambda_{11}$ satisfy Equation 1 for the periodicity $\Lambda$ of the grating reflector 820. Thus, although the input light signal incident upon the first end 802 of the first multimode optical fiber 800, as represented by the arrow 804, has a plurality of optical frequencies (i.e., $\lambda_1$, $\lambda_2$, $\lambda_3$ ... $\lambda_n$) only the optical signal having the wavelength $\lambda_1$, having propagation mode wavelengths $\lambda_{01}$ and $\lambda_{11}$ satisfying the equation 1, will be reflected by the grating reflector 800.

The system in FIG. 11 operates as follows. The light incident to the first end 802 of the first optical fiber 800 in the $LP_{01}$ mode propagates to the mode selector 814. The mode selector 814 is constructed with the fibers 800 and 810 selected so that the phase propagation velocities are matched only for coupling from the $LP_{11}$ mode of the first optical fiber 800 to the second $LP_{01}$ mode of the second optical fiber 810. Thus, optical signals propagating in the $LP_{01}$ mode of the first optical fiber 810 pass through the interaction region of the mode selector 814 with little coupling to the second optical fiber 810. The light incident to the grating reflector 820, represented by the arrow 830, thus comprises substantially all of the input light at the input frequencies $\lambda_1$, $\lambda_2$, $\lambda_3$... $\lambda_n$ in the $LP_{01}$ mode. At the grating reflector 820 the input light at the frequency $\lambda_1$, which satisfies the equation (1) for the wavelength $\lambda_{01}$ for the $LP_{01}$ propagation mode and the wavelength $\lambda_{11}$ for the $LP_{11}$ propagation mode is reflected by the grating reflector 820 and propagates in the reverse direction in the $LP_{11}$ propagation mode as indicated by an arrow 840. When this light is incident upon the mode selector 814, the optical signal in the $LP_{11}$ propagation mode of the first optical fiber 800 is coupled to the $LP_{01}$ propagation mode of the second optical fiber 810 and is provided as an output signal, represented by an arrow 850, from an end 852 of the second optical fiber 810. The input optical signals at the other frequencies (represented by $\lambda_2$, $\lambda_3$... $\lambda_n$ are not reflected by the grating reflector 820 and continue to propagate in the $LP_{01}$ propagation mode of the first optical fiber 800 in the original forward direction as indicated by an arrow 860. Thus, the mode selector 814 and the grating reflector 820 act together to select the optical signal at the frequency corresponding to the wavelength $\lambda_1$, and provide it as a discrete output signal from the end 852 of the second optical fiber 810 in the $LP_{01}$ propagation mode. Additional pairs of mode selectors and grating reflectors (not shown) constructed for the other wavelengths (i.e., $\lambda_2$, $\lambda_3$, ... $\lambda_n$) can be formed on the first optical fiber 800 to select the other wavelengths and provide them as discrete output signals. Thus, the embodiment of FIG. 11 provides an advantageous means for separating optical frequencies from an input light having a plurality of input frequencies.

From the discussions relating to the embodiments set forth above, it will be understood that the mode selector of the present invention utilizes two dissimilar optical fibers, one of which is multimode, while the other may be either single-mode or multimode. The multimode fibers of the present invention, however, are a special class of multimode fibers, referred to herein as "few-mode fibers," which propagate light in no more than about five to ten spatial modes. Those skilled in the art will recognize that it is difficult to accomplish the propagation velocity matching and mismatching discussed above in fibers that have more than about five to ten modes, since the difference between the propagation velocities decreases as the number of modes increases. Further, the propagation velocity difference for higher order modes is ordinarily less than for lower order modes. For example, the propagation velocity difference between the 99th order mode and the 100th order mode of a hundred mode fiber is very small compared to the propagation velocity difference between the first and second order modes of a double mode fiber. Thus, it is particularly advantageous to use few mode fibers in the present invention.

While preferred embodiments of this invention have been disclosed herein, those skilled in the art will appreciate that changes and modifications may be made therein without departing from the spirit and the scope of this invention, as defined in the appended claims.

We claim:

1. A fiber optic mode selector, comprising:
   first and second dissimilar optical fibers, said first fiber having at least one propagation mode, said second fiber having at least two propagation modes, only two of said modes having matching propagation constants, one of the matching modes being in said first fiber and the other being in said second fiber, said fibers juxtaposed to form an interaction region, the core of said second fiber having a non-circular cross section selected to provide a stable energy distribution pattern for the higher order of said two modes of said second fiber, the proximity of said cores at said interaction region selected such that light propagating in one of the matching modes in one of said fibers is coupled to the other of the matching modes in the other of said fibers, the remainder of said modes all having mismatched propagation constants such that the propagation constant of each of the mismatched modes differs sufficiently from all of the other modes to prevent substantial optical coupling between any of the mismatched modes.

2. A fiber optic mode selector, as defined by claim 1, wherein said second fiber has a core which has a maximum cross sectional dimension greater than that of said first fiber.

3. A fiber optic mode selector as defined by claim 2, wherein said first fiber is a single-mode fiber which propagates light exclusively in the first order mode.

4. A fiber optic mode selector, as defined by claim 3, wherein said second fiber is a two-mode fiber which propagates light exclusively in first and second order modes.

5. A fiber optic mode selector as defined by claim 1, wherein said fibers are juxtaposed over an interaction region, the length of said interaction region selected to cause substantially complete coupling between the two modes having matched propagation constants.

6. A fiber optic mode selector as defined by claim 1, wherein one of said modes having matching propagation constants is a higher order mode than the other of said modes having matching propagation constants.

7. A fiber optic mode selector, comprising:
   first and second dissimilar optical fibers, said first fiber having at least one propagation mode, said second fiber having at least two propagation modes, only two of said modes having matching propagation constants, one of the matching modes being in said first fiber and the other being in said second fiber, one of the matching modes being a higher order mode than the other of the matching modes, the cores of each of said fibers having a cross section which is substantially the same inside said interaction region as outside said interaction region, the proximity of said cores at said interaction region selected such that light propagating in one of the matching modes in one of said fibers is coupled to the other of the matching modes in the other of said fibers, the remainder of said modes all having mismatched propagation constants such that the propagation constant of each of the mismatched modes differs sufficiently from all of the other modes to prevent substantial optical coupling between any of the mismatched modes, the second fiber being configured so as to provide means for controlling the orientation of the energy distribution pattern in said higher order mode to control the coupling between said modes having matching propagation constants.

8. A fiber optic mode selector as defined in claim 7, wherein said controlling means comprises a non-circular core of said second fiber.

9. A fiber optic mode selector, as defined by claim 1, wherein each of said fibers is arcuately mounted in a supporting structure.

10. A fiber optic mode selector, as defined by claim 1, wherein each of said fibers has cladding removed from one side thereof to form an oval cladding surface.

11. A fiber optic mode selector, as defined by claim 1, wherein said fibers are substantially parallel throughout said interaction region.

12. A fiber optic mode selector, as defined by claim 1, wherein the light is coupled between said two fibers by evanescent field interaction between said matching modes.

13. A fiber optic mode selector, as defined by claim 1, wherein the length of said interaction region is at least an order of magnitude larger than the maximum cross sectional dimension of the core of either of said fibers.

14. A fiber optic mode selector, comprising:
   first and second dissimilar optical fibers, at least one of said fibers propagating light in plural spatial modes, said fibers juxtaposed to form an interaction region for coupling light exclusively between a selected mode in said first fiber and a selected mode in said second fiber, one of said selected modes being of a higher order than the other of said selected modes, the core of at least one said fibers having a non-circular cross section selected to provide a stable energy distribution pattern for the higher order of said selected modes, the length of said interaction region being at least an order of magnitude greater than the maximum cross sectional dimension of the core of either of said fibers, and each of said fibers having a cross-sectional area which is substantially the same within said interaction region as outside said interaction region.

15. A method of manufacturing a fiber optic mode selector utilizing two dissimilar optical fibers, one of said fibers propagating light in plural spatial modes for a selected wavelength and the other of said fibers propagating light in at least one spatial mode for said wavelength, said method comprising the steps of:
  selecting the core of said one fiber to provide a stable energy distribution pattern for the higher order modes of said plural spatial modes of said one fiber;
  juxtaposing said optical fibers to form an interaction region for coupling light between said fibers; and
  selecting the propagation constants for said modes such that light is selectively coupled in said interaction region between only two selected modes of said fibers, one of said selected modes being in one of said fibers and the other of said selected modes being in the other of said fibers.

16. A fiber optic apparatus, comprising:
  a first optical fiber having two propagation modes, each having a different propagation velocity;
  a second optical fiber, having a propagation mode with a propagation velocity which matches the propagation velocity of one of the two modes of said first fiber, said first and second fibers juxtaposed to provide coupling between the propagation mode of the second fiber and said one mode of the first fiber; and
  a grating reflector, disposed at a location on said first fiber for coupling light between the two propagation modes of the first fiber.

17. The fiber optic apparatus as defined in claim 16, wherein said first optical fiber has an ellipitical core.

18. The fiber optic apparatus as defined in claim 17, wherein one of the propagation modes of said first optical fiber includes eigenmodes which have a lobe-like pattern, the optical fiber causing the eigenmodes to propagate down the first optical fiber without changing, thereby allowing the lobe-like pattern to be oriented for maximum coupling between said first optical fiber and said second optical fiber.

19. A method of separating plural light signals having respective plural frequencies, comprising:
  selectively coupling one of said plural light signals from a first propagation mode of an optical fiber to a second propagation mode of said optical fiber, each of said propagation modes of said optical fiber having different propagation velocities; and
  optically coupling said second mode of said optical fiber to a propagation mode of a dissimilar optical fiber, said mode of said dissimilar optical fiber having a propagation velocity which matches the propagation velocity of said second mode to cause transfer of light therebetween, without causing substantial transfer light between said first mode and said dissimilar optical fiber mode.

20. The method of claim 19, wherein said step of selectively coupling additionally comprises the step of reversing the direction of propagation of said one of said plural light signals.

21. A fiber optic mode selector, comprising:
  first and second dissimilar optical fibers, said first fiber having at least one propagation mode, said second fiber having at least two propagation modes, and an elliptical core, only two of said modes having matching propagation velocities, one of the matching modes being in said first fiber and the other being in said second fiber, said fibers juxtaposed to form an interaction region, the cores of each of said fibers having a cross section which is substantially the same inside said interaction region as outside said interaction region, the proximity of said cores at said interaction region selected such that light propagating in one of the matching modes in one of said fibers is coupled to the other of the matching modes in the other of said fibers, the remainder of said modes all having mismatched propagation velocities such that the propagation velocity of each of the mismatched modes differs sufficiently from all of the other other modes to prevent substantial optical coupling between any of the mismatched modes.

22. The fiber optic mode selector as defined in claim 21, wherein one of the propagation modes of said second optical fiber includes eigenmodes which have a lobe-like pattern, the optical fiber causing the eigenmodes to propagate down said second optical fiber without changing, thereby allowing the lobe-like pattern to be oriented for maximum coupling between said first and second optical fibers.

23. A fiber optic apparatus, comprising:
  a source of optical energy which provides light at first and second wavelengths;
  a fiber optic mode selector, comprising first and second dissimilar optical fibers, said first fiber having at least one propagation mode, said second fiber having at least a first and a second propagation mode, said second fiber coupled to receive light at said first and second wavelengths, only one of said first and second propagation modes having a matching propagation constant with said one propagation mode in said first fiber, said matching mode in said second fiber being of a higher order than said one matching propagation mode in said first fiber, said first and second fibers juxtaposed to form an interaction region, the proximity of the cores of each of said fibers at said interaction region selected such that at least a portion of the light propagating in said second fiber is coupled in said interaction region from said matching propagation mode in said second fiber to said one matching propagation mode in said first fiber; and
  an intermode coupler which couples light propagating in said second fiber from one of said first and second propagation modes to the other of said first and second propagation modes such that substantially all of said light at said first wavelength is in said first propagation made and substantially all of said light at said second wavelength is in said second propagation mode, said mode selector coupling light at one of said wavelengths from said second fiber to said first fiber without substantial coupling of light at the other of said wavelengths.

24. A fiber optic apparatus as defined in claim 23, wherein said first and second propagation modes in said second fiber comprises the fundamental mode and the second order mode.

25. A fiber optic apparatus as defined in claim 23, wherein said one propagating mode in said first fiber is the fundamental mode.

26. A fiber optic apparatus as defined in claim 23, wherein said first fiber is a monomode fiber and said second fiber is a multimode fiber having a low number of modes.

27. A fiber optic apparatus as defined in claim 23, wherein said intermode coupler comprises a grating reflector.

28. A fiber optic mode selector as defined in claim 23, wherein the core of the second fiber has an elliptical cross section.

29. A fiber optic apparatus, comprising:
- a first optical fiber having first and second spatial propagation modes;
- a source of light coupled to said optical fiber such that said light propagates in said fiber;
- an intermode coupling device which couples said light between said two propagation modes such that a first optical signal having a first optical characteristic propagates in said first spatial propagation mode and a second optical signal having a second optical characteristic propagates in said second spatial propagation mode; and
- a second optical fiber, juxtaposed with said first optical fiber to form a mode selector which couples said first optical signal from said first propagation mode, without substantial coupling of said second optical signal from the second propagation mode, to separate said first and second optical signals having said first and second optical characteristics such that said first optical signal propagates in said first fiber and the said second optical signal propagates in said second fiber.

30. A fiber optic apparatus, as defined by claim 29, wherein said first and second optical characteristics comprise first and second wavelengths, respectively.

31. A fiber optic apparatus, as defined by claim 29, wherein said intermode coupling device comprises a grating reflector.

32. A fiber optic apparatus, as defined by claim 29, wherein said intermode coupling device comprises a frequency shifter.

33. A fiber optic apparatus, as defined by claim 29, wherein at least one of said optical fibers has a non-circular core.

34. A fiber optic apparatus, as defined by claim 29, wherein the core of said first optical fiber has an elliptical cross section.

* * * * *

UNITED STATES PATENT AND TRADEMARK OFFICE
CERTIFICATE OF CORRECTION

PATENT NO. : 4,828,350

DATED : May 9, 1989

INVENTOR(S) : Shaw et al

It is certified that error appears in the above-identified patent and that said Letters Patent is hereby corrected as shown below:

Column 4, line 50, change "104 remining between" to --104 remaining between--.

Column 10, line 1, change "vector 402" to --vector 400--.

Column 11, line 4, change "portion 654" to --portion 656--.

Column 11, line 59, change "the the optical" to --the optical--.

Column 18, line 54, change "propagation made" to --propagation mode--.

Signed and Sealed this

Twenty-second Day of October, 1991

Attest:

HARRY F. MANBECK, JR.

*Attesting Officer*    *Commissioner of Patents and Trademarks*